(12) United States Patent
Hoyashita et al.

(10) Patent No.: US 7,043,194 B2
(45) Date of Patent: May 9, 2006

(54) LEARNING SYSTEM

(75) Inventors: Shigeru Hoyashita, Saga (JP); Yasuyuki Ikegami, Saga (JP); Kazuhiro Sumi, Saga (JP)

(73) Assignee: Saga University, Saga (JP)

( * ) Notice: Subject to any disclaimer, the term of this patent is extended or adjusted under 35 U.S.C. 154(b) by 256 days.

(21) Appl. No.: 10/346,085

(22) Filed: Jan. 17, 2003

(65) Prior Publication Data
US 2004/0214152 A1 Oct. 28, 2004

(30) Foreign Application Priority Data
Feb. 6, 2002 (JP) ............................. 2002-029324

(51) Int. Cl.
*G09B 19/00* (2006.01)
(52) U.S. Cl. ..................... 434/353; 704/1; 434/323
(58) Field of Classification Search ................ 434/322, 434/323, 350, 236–238, 353–4; 704/1
See application file for complete search history.

(56) References Cited

U.S. PATENT DOCUMENTS

| 3,685,169 | A | * | 8/1972 | Blau et al. ................... 434/342 |
| 5,944,530 | A | * | 8/1999 | Ho et al. ..................... 434/236 |
| 5,947,747 | A | * | 9/1999 | Walker et al. ............... 434/354 |
| 6,461,166 | B1 | * | 10/2002 | Berman ....................... 434/323 |
| 6,585,521 | B1 | * | 7/2003 | Obrador ...................... 434/236 |
| 2001/0023059 | A1 | | 9/2001 | Toki |

FOREIGN PATENT DOCUMENTS

| CN | 1314645 A | 9/2001 |
| JP | A-2001-228785 | 8/2001 |
| JP | A-2001-249608 | 9/2001 |
| JP | A-2002-7586 | 1/2002 |

* cited by examiner

*Primary Examiner*—Kathleen Mosser
(74) *Attorney, Agent, or Firm*—Oliff & Berridge, PLC

(57) ABSTRACT

A learning system including a server and a user terminal is provided for providing a lecture to a user and for evaluating the user. The present systems has the server and the user terminal, the server has a storage unit for storing at least one educational material and a transmitting unit for transmitting said educational material to the user terminal, the user terminal has a receiving unit for receiving said educational material from the server; display unit for presenting the received educational material to a user; a recognizing unit for recognizing movement of the user; and a transmitting unit for transmitting said recognized movement, wherein the server further has a receiving unit for receiving the movement from the user terminal; and an evaluating part for evaluating learning behavior of the user based on the movement.

4 Claims, 8 Drawing Sheets

| Keyword | Sub keyword 1 | Sub keyword 2 |
|---|---|---|
| I/O interruption (20pts) | Normal end (2pts) | Channel (2pts) |
| Machine check interruption (20pts) | Machine fault (2pts) | Power failure (2pts) |
| Program interruption (20pts) | Program error (2pts) | Protection exception (2pts) |

LEARNING SYSTEM

BACKGROUND OF THE INVENTION

1. Field of the Invention

The present invention relates to a learning system, and more particularly, relates to a learning system for providing educational materials such as educational software or lectures on TV/Internet, and for communicating with users in twoway, and for monitoring learning behavior of users to evaluate automatically comprehension about the educational materials. According to such a learning system, IT-driven lectures can be more easily and effectively provided.

2. Related Art Statements

Conventional distance learning systems using educational materials (e.g., storage media such as video tape or CD, or lecture program on Net leveraging information technology (IT)) aim at large number of people (such as a school level, class or each student), each user utilizes the educational material when he or she has a convenient time at a convenient place, thus it is difficult that these conventional learning systems evaluate comprehension of respective users and manage learning achievements such as comprehension or learning progress of users.

Additionally, in a conventional distance learning system using educational materials, it is difficult to frequently give users any examinations on educational materials and to let users submit any reports on them. Therefore the learning system could not evaluate comprehension of respective users and could not manage learning outcomes such as comprehension or progress of learning of users. Even if such a conventional leaning system using IT performs an examination, the examination is a uniform test such as a true-false test or a multiple-choice test, thus the leaning system could not effectively and properly evaluate and manage learning outcomes of users with such a test. By the same token, a conventional learning system using IT could not effectively evaluate and manage reports or answers submitted from users.

In conventional educational materials or lectures on TV, there is no effective learning system for collecting case data related to the educational materials.

In an environment of conventional educational materials or lectures on Net using IT, there is no system for evaluating and managing whether or not educational materials, lectures and exercises are fitted with respective users. Furthermore, in conventional educational materials or lectures on Net using IT, there is no system for effectively evaluating and managing user's presentation.

Additionally, in such conventional educational materials or lecture on Net using IT, users could utilize only limited educational materials or lectures on Net.

Furthermore, in an environment of conventional educational materials or lectures on Net using IT, a learning system does not work with experience-oriented type of education such as workshop or its evaluation.

SUMMARY OF THE INVENTION

It is an object of the present invention to provide a learning system for gathering any data from users while users take the lectures to automatically evaluate and manage the gathered data. In other words, it is an object of the invention, in an environment of educational materials or lectures on Net using IT, to provide a learning system for providing educational materials, which include "educational materials" in narrow sense and other educational tools or lectures on Net leveraging IT, to users and for automatically evaluate and manage comprehension of users and progress in lectures.

In order to attain the above mentioned object, a learning system according to the invention, including a server and at least one user terminal connected to said server via a network, wherein the server comprises:

storing means for storing at least one educational material; and transmitting means for transmitting said educational material to the user terminal via the network, the user terminal comprises:

receiving means for receiving said educational material from the server via the network;

presentation means for presenting the received educational material to a user (i.e. presenting any perceptible information such as a sound, an image, a motion picture, or a Braille (raised letters) using the educational materials);

recognizing means for recognizing movement of the user while the any perceptible information is presented to the user; and transmitting means for transmitting said recognized movement of the user;

wherein the server further comprises;

receiving means for receiving the movement from the user terminal via the network; and evaluating means for evaluating learning behavior (such as degree of concentration) of said user based on said movement in real time.

According to the present invention, it is possible to transmit learning behavior of users, which previously has not been evaluated or comprehended in the conventional distance learning system such as a lecture on Net, from the client side to the server side in real time to appropriately evaluate the learning behavior of the respective users in real time. The present system may use various network such as Internet, cable TV network or satellite broadcasting network and various communication pathway such as a subscriber's phone line (e.g. ISDN or ASDL) or a dedicated line (e.g. an optical fiber). Since file sizes of educational materials are relatively large, it is preferable that the present system communicates via a high speed network such as broadband Internet, satellite broadcasting network, or ground-based broadcasting network. However, the present system may communicate via a relatively low speed network as an uplink, because uplink data is relatively small. For instance, the server of the present system may transmit some data (typically educational materials) via a satellite-broadcasting network as a downlink. In contrast, the user terminal of the present system may transmit some data via Internet as an uplink.

In a preferable embodiment of the learning system according to the present invention, said recognition means comprises at least one means selected from the group consisting of means for capturing an image of the user, means for capturing a voice of the user, and means for monitoring input status to one or more I/O devices associated with said user terminal.

According to this embodiment of the present invention, the attitude toward learning of each user can more appropriately and simply evaluated. For example, the present learning system prompts a user to indicate any action (e.g., raising a right hand, vocalizing any sound, or selecting one of the radio button) and captures movements behavior in response to the instruction using a camera or any input device, thereby the learning system can simply and definitely grasp whether or not a user takes a lecture earnestly or seriously.

In another embodiment of the learning system according to the present invention, said user terminal further comprises:

identification means for capturing personal identification information of the user prior to presenting the educational material; and transmitting means for transmitting the captured personal identification information to said server via the network, said server comprises receiving means for receiving said personal identification information from the user terminal.

According to this embodiment of the present invention, the present system receives personal identification information from users to authenticate respective users based on the personal identification information with reference to a prepared database, which stores pieces of personal identification information (e.g. preassigned account IDs and passwords associated with the respective IDs), to determine whether or not to transmit said educational material based on the authentication. Only if one user is authorized to receive the educational material, the present system transmits the material to the user. The present system can utilize the IDs and passwords to charge a user to whom said educational material is transmitted with a predetermined fee that is individually set by respective educational materials.

In still another embodiment of the learning system according to the present invention, said identification means in the user terminal comprises at least one biometrics sensor (e.g., identifying or verifying fingerprint, iris, voice pattern, handwriting pattern, retina or face form, etc.).

According to this embodiment of the present invention, biometric data (such as a fingerprint, an iris pattern, a voice pattern), which is captured using the sensor and is unique for each user, can be used to more simply and definitely identify a user.

In still another embodiment of the learning system according to the present invention, said user terminal further comprises:

means for presenting one or more predetermined questions, which are prepared for the respective educational materials, for measuring comprehension to prompt the user to input one or more answers or reports to said predetermined questions;

means for accepting said one or more answers or reports from the user in response to said one or more predetermined questions; and means for transmitting said one or more answers or reports to said server via the network, wherein said server further comprises evaluating means for receiving said answers or reports from said user terminal to evaluate comprehension of the user based on said answers or reports.

In still another embodiment of the learning system according to the present invention, said evaluating means of the server comprises evaluating means for determining whether or not said answers or reports include predetermined one or more keywords expressing comprehension or achievement of the user with respect to said educational material to evaluate comprehension of the user based on both the included keywords and a criteria of a marks allocation of said keywords.

In still another embodiment of the learning system according to the present invention, said evaluating means of the server comprises means for determining whether or not there are one or more subkeywords expressing the respective keywords in the vicinity of the respective keywords (e.g. "vicinity" means an area within the sentence, stage or paragraph including the keywords, or an area within the predetermined number of words, phrases or sentences) to evaluate comprehension of the user based on a number of the founded subkeywords and/or a criteria of a marks allocation of said subkeywords (e.g. the marks allocation is varied based upon a predetermined level of importance of the respective subkeywords and/or a location of the respective subkeywords (i.e. by figuring out the distance from the keyword to the subkeyword)).

In conventional educational environment, an instructor or a teacher marks each answer sheet by hand and evaluates each report by hand, furthermore a teacher holds an oral examination to evaluate each student. However, according to this embodiment of the present invention, the present system can simply and reliably evaluate comprehension or learning activities of the learner based upon the answer including texts or speeches (such as an answer to an essay examination or a report) of each user.

DETAILED DESCRIPTION OF THE PREFERRED EMBODIMENTS

Several preferred embodiments of the learning systems according to the present invention will be described with reference to the accompanying drawings.

Figure 1:
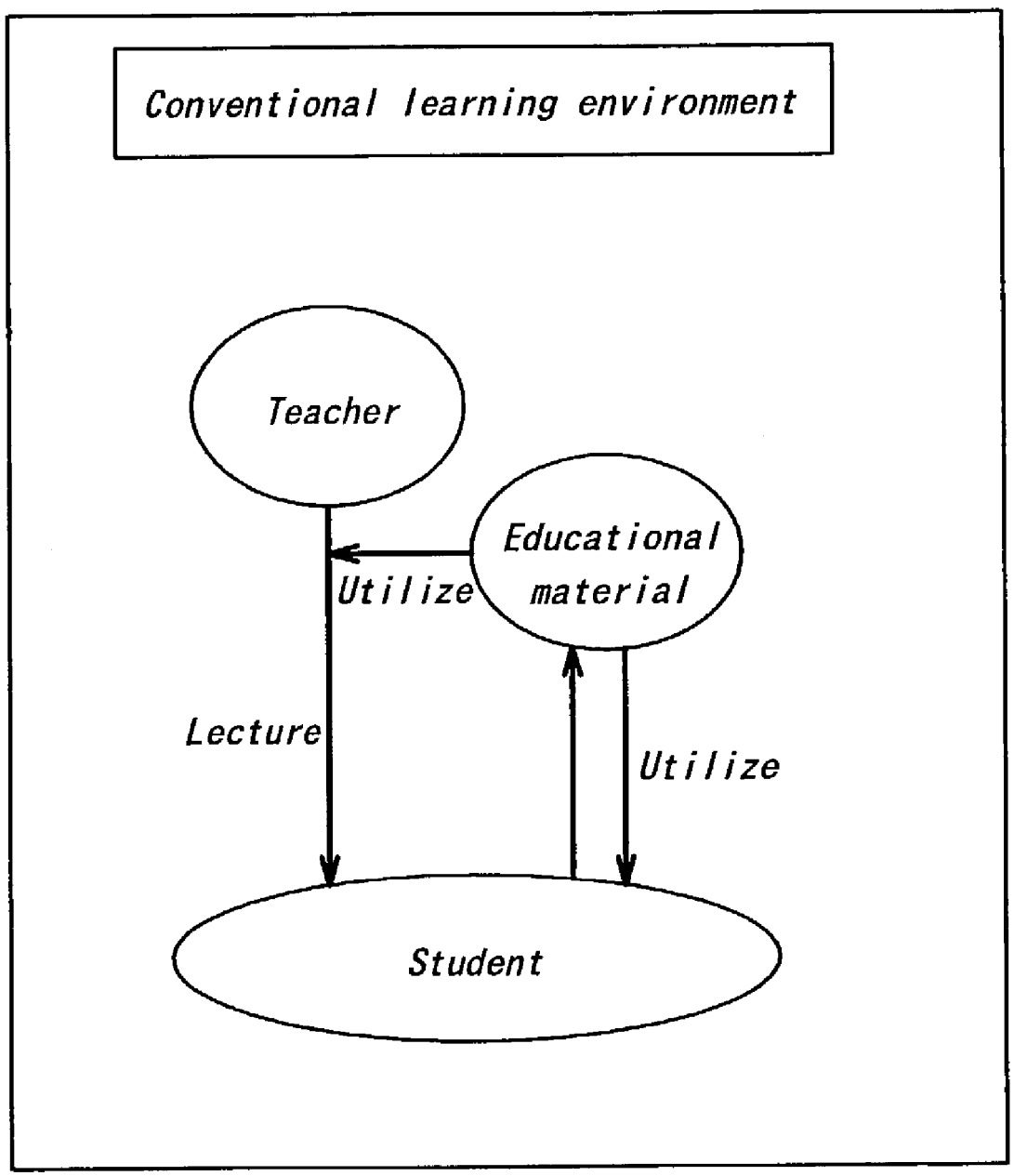
FIG. 1 is a block diagram illustrating a concept of the conventional learning environment.

FIG. 1 is a block diagram illustrating a concept of the conventional learning environment. As shown in FIG. 1, in the conventional learning environment, teacher typically presents a lecture to students in a classroom using an educational material such as a school textbook, on the other hand students take the lecture with reference to the educational material as needed. That is, a lecture and an educational material are separately provided to students and are handled separately. Accordingly, in the conventional learning environment teachers could not exploit educational materials successfully.

Figure 2:
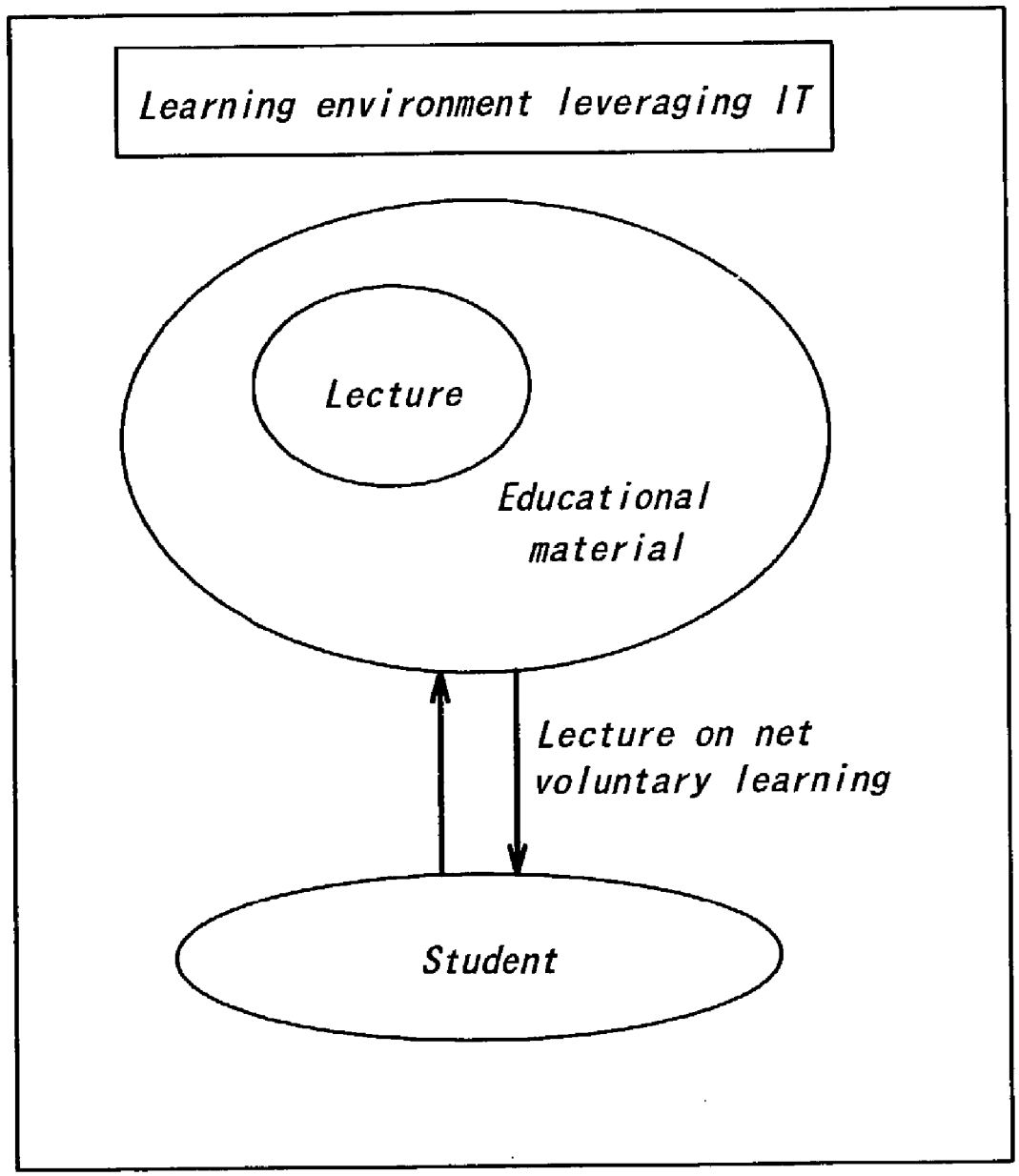
FIG. 2 is a block diagram showing a concept of the learning environment realized by the learning system according to the invention.

FIG. 2 is a block diagram showing a concept of the learning environment realized by the learning system according to the invention. As shown in FIG. 2, according to the present invention functions provided by teachers or instructors are incorporated into an educational material as a lecture in digital information such as a video. Such an educational material including a digitalized lecture is provided to each student in a broadcast format or on Video On Demand (VOD) basis via network (e.g., Internet or satellite broadcasting network, etc.).

Figure 3:
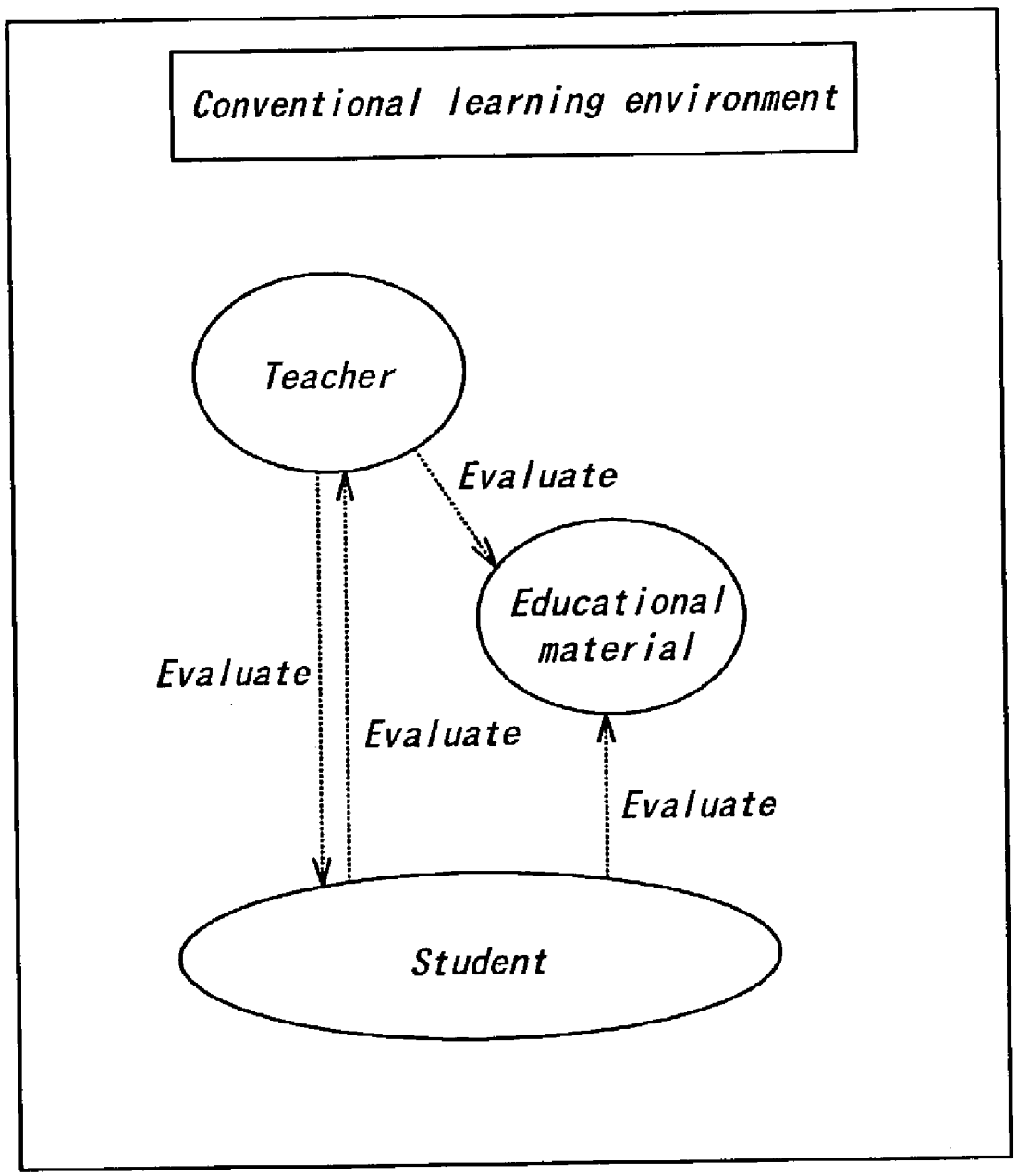
FIG. 3 is a block diagram presenting a concept of evaluating scheme of the conventional learning environment.

FIG. 3 is a block diagram presenting a concept of evaluating scheme of the conventional learning environment. As depicted in FIG. 3, in the conventional learning environment, teacher evaluates separately student work and the educational material and students also evaluate separately a teacher and the educational material. Thus, up to now learning environment such as including both teacher activities and educational materials could not be evaluated.

Figure 4:
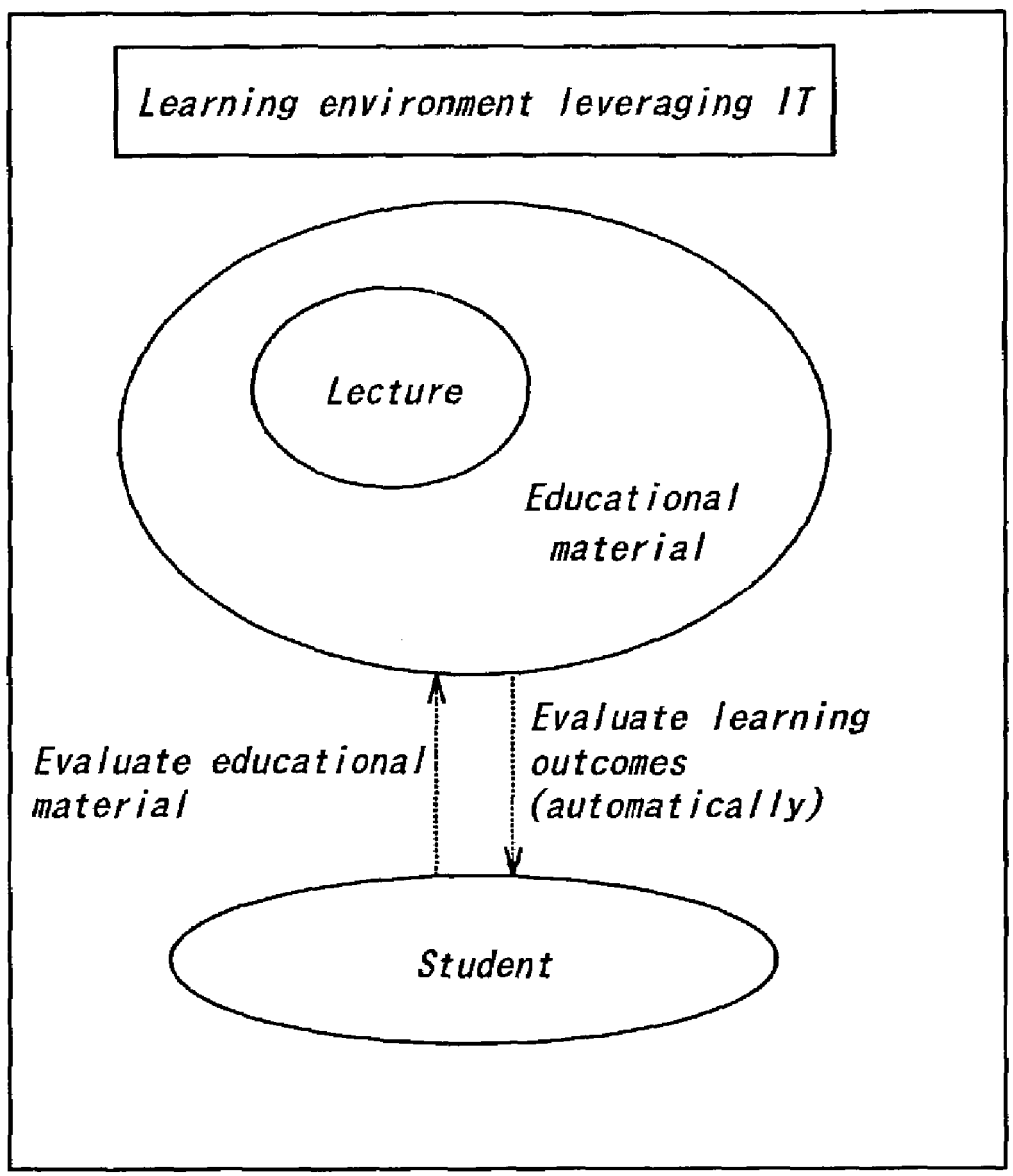
FIG. 4 is a block diagram depicting a concept of evaluating scheme of the learning environment realized by the learning system according to the invention.

FIG. 4 is a block diagram depicting a concept of evaluating scheme of the learning environment realized by the learning system according to the invention. As illustrated in FIG. 4, according to the present invention, functions such as provided by teachers or instructors are substantially incorporated into an educational material as a lecture in digital information such as a video, thus it makes possible to evaluate totally an learning environment or an educational environment utilizing such an educational material.

Figure 5:
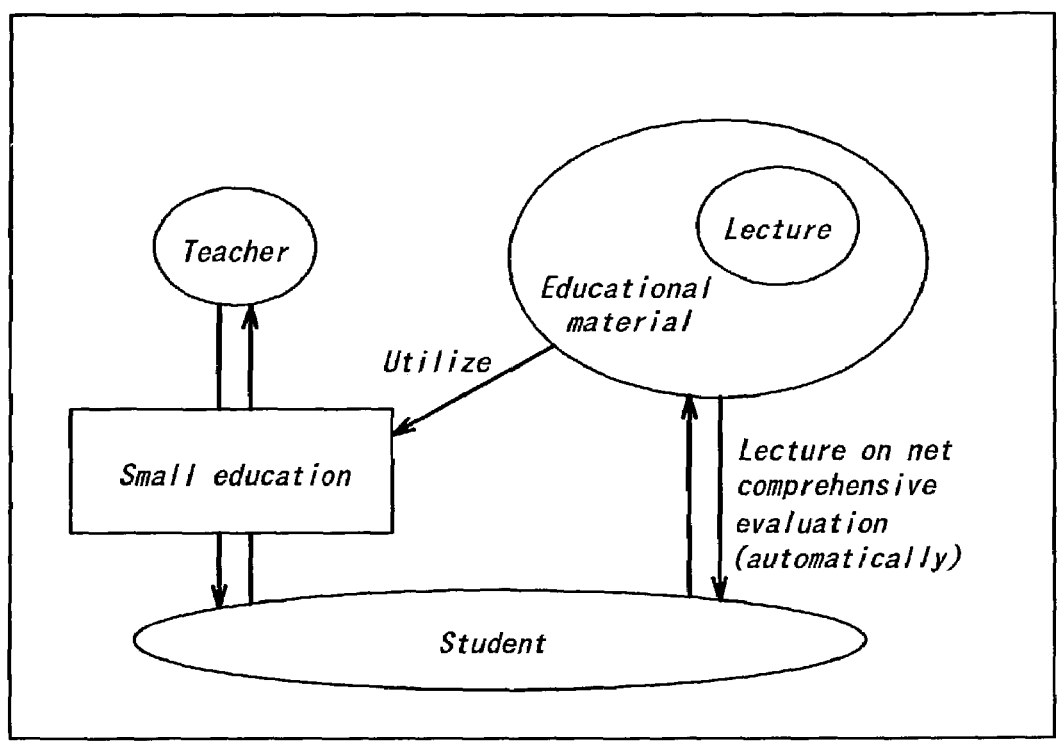
FIG. 5 is a block diagram illustrating a concept of the learning environment realized by the learning system according to the invention.

FIG. 5 is a block diagram illustrating a concept of the learning environment realized by the learning system according to the invention. As shown in FIG. 5, according to the present invention conventional mass education can effectively be replaced with the present learning system. Thus this allows to lighten teacher's burden. In other words, teachers can shift from conventional "mass education" to "small education" such as a face-to-face lecture in a small class.

Figure 6:
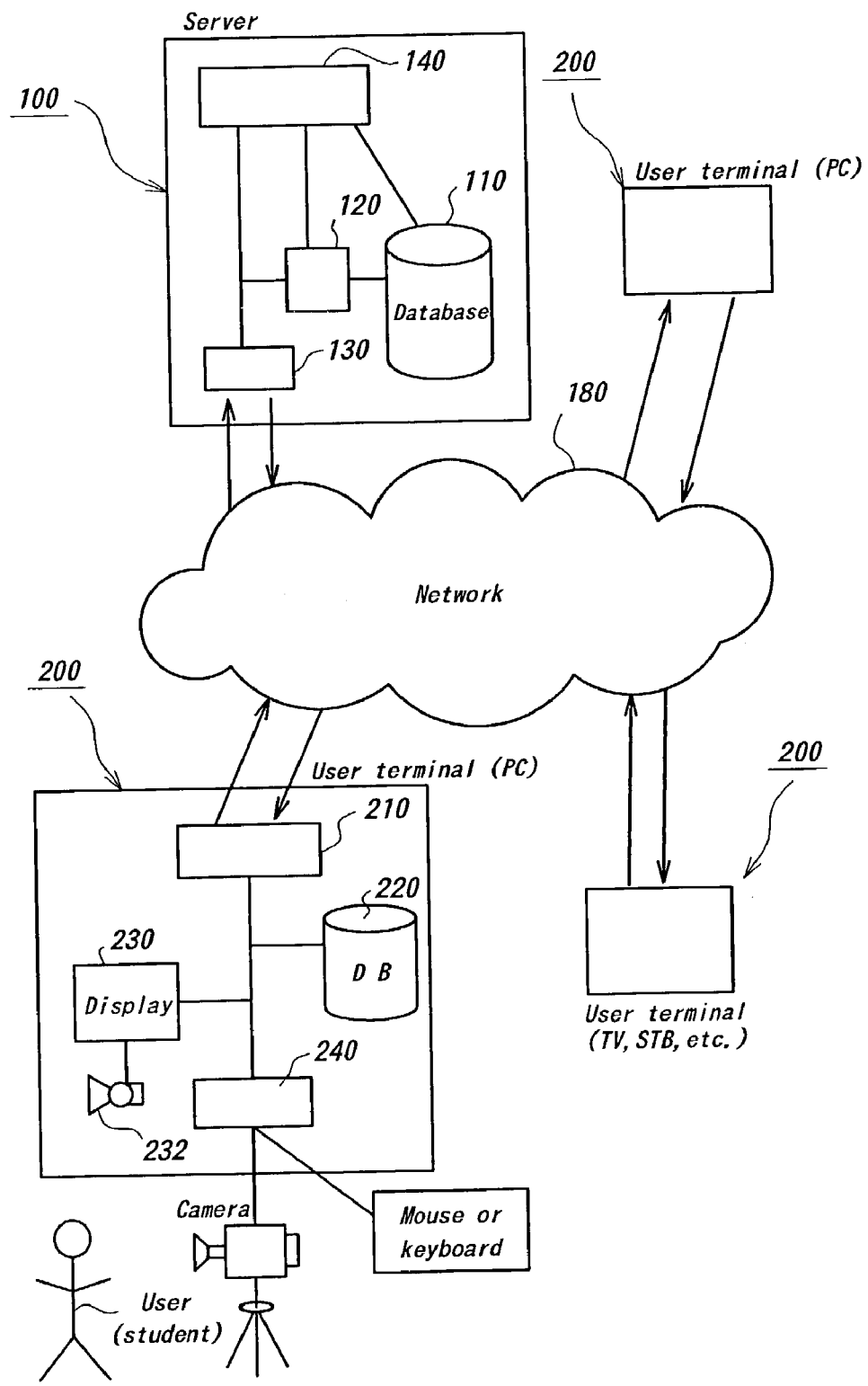
FIG. 6 is a block diagram showing a basic configuration of the learning system according to the invention.

FIG. 6 is a block diagram showing a basic configuration of the learning system according to the invention. As illustrated in FIG. 6, the present learning system is provided, which includes a server 100, at least one user terminal connected the server 100 via a network 180. The server 100 includes a storage device 110 which stores at least one educational materials, a transmission control 120 which manages for transmission of information such as said educational material to a user terminal via the network 180, and an external interface 130 which communicates with any external device such as the user terminal to exchange information such as said educational material.

User terminal 200 (e.g., PC, STB, or interactive TV) includes an external interface 210 which communicates with any external device such as the server to exchange information such as said educational material, a display device 230 which displays images using visual data from said received educational material, and a speaker 232 which playbacks a sound using sound data from said received educational material. The user terminal 200 further includes a movement recognition part 240 which captures data which is recorded by a camera or inputted by a mouse or a keyboard to recognize user's movements.

The recognized user's movements by the movement recognition part 240 is transmitted to said server 100 via the network 180, said server 100 then receives and stores them in the database. The server 100 further includes an evaluation part 140 which evaluates user's learning outcome, behavior, academic achievement, or degree of concentration based on said received user's movements. The result of evaluation is stored with respect to each user in the storage device 110.

The server 100 and the user terminal further comprise a CPU, a RAM, a ROM, an auxiliary storage device, and I/O ports (not shown). The components in the present learning system cam be realized as predetermined software modules i.e. program. Of course, said storage device and the auxiliary storage device can store any received data and any processed data to build any database as needed.

Various movement recognition techniques for capturing human movement such as using motion images or without motion images have been developed. For example, one technique of achieving this is to attach identifications markers to a human's body and capture the motion picture using a camera. Alternatively, another technique is to merely record human body movement using a camera and extracts features from joints angles information and recognizes human movement based on the extracted features. A technique without motion images is to attach a gyro sensor and/or an acceleration sensor and senses both the direction of motion and acceleration of the part of human body (e.g., arm, hand, or head) and recognize human movement from the sensed information. There is different type of method for recognize user's activities. For example, an I/O device such as a mouse, a keyboard or a touch panel screen, which are associated or connected with said user terminal, may be used to monitor input state of the I/O device by the user to recognize user's movements (i.e. any activities). Above mentioned techniques, methods, and devices are all well known to those skilled in the art.

Additionally, in order to properly grasp various factor (such as user's objective, frequency of use, a leaning outcomes, a progress, or a learning environment (e.g., age, learning background, or location)), the learning system according to the present invention may be utilized to monitor bidirectional communication between the present system and the user with reference to a given database to evaluate whether the educational material fits to the user.

The learning system according to the present invention may further comprises: authentication means for authenticating said user based on factors (such as an accounting ID with a password, a fingerprint, a voice print, a handwriting pattern, or a facial feature) with reference to an authentication database; and evaluating means for evaluating earnestness of the every user while taking the lecture based on factors (such as frequency of number of times of clicking or typing any I/O device per a predetermined time, motion in which a user nods with understanding, motion in which a user shakes head with uncomprehending, or voice modulation of a user, etc.).

The learning system according to the present invention may be utilized to evaluate whether an educational material is adapted to a given educational level, and may build and manage a database including educational materials, contents of the educational materials, another educational information (such as achievements of the lectures, questions, speed of response to a question, test scores, report assignments, contents of reports, or submission status of reports, etc.), and may ask a third party evaluation agency for evaluation to add the result of evaluation to utilize the result by general public such as other user as well as other educational information stored in the database.

The learning system according to the present invention can perform a true-false test or a multiple-choice test, and also may perform more complicated test such as essay test or report with typing keyboard to evaluate the answer to the test with any conventional artificial intelligence in such a way that checking a number or respective positions of characters, keywords or subkeywords in the answer or the report which are expressing learning outcomes with respect to the lecture provided by this system, or extracting semantics from the answer with reference to any database.

Figures 7, 8:
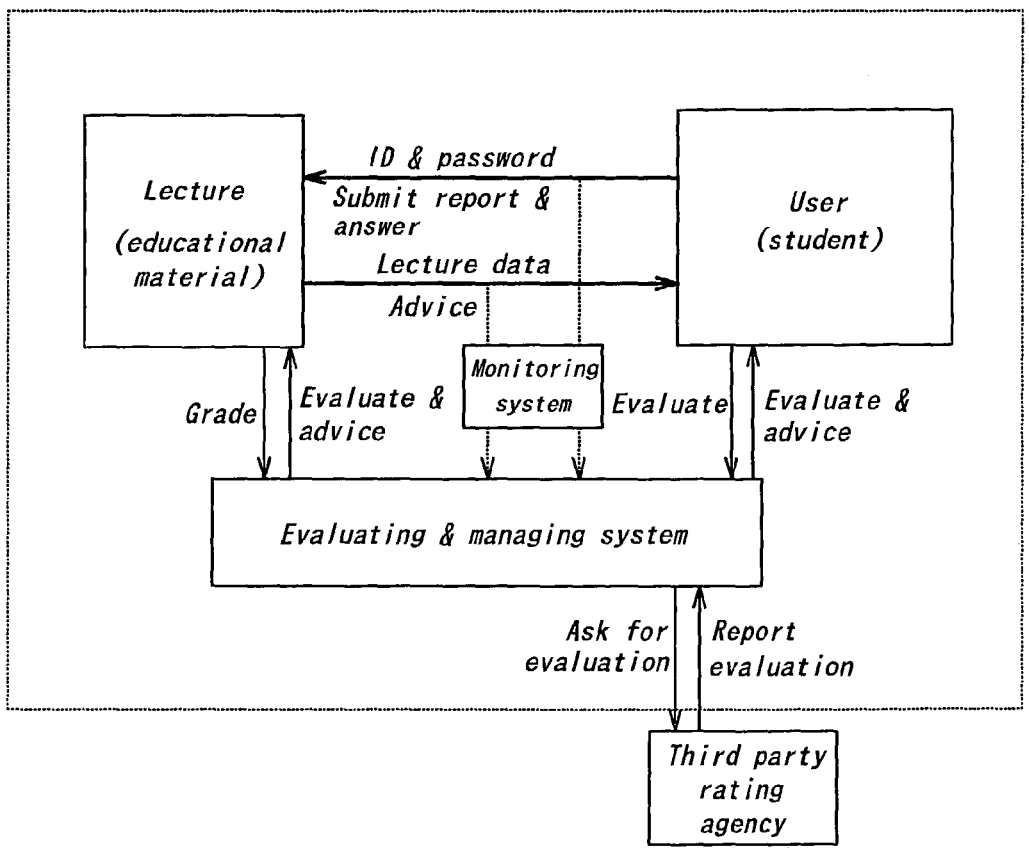
FIG. 7 is a table showing keywords, subkeywords and theirs allocation of marks.
FIG. 8 is a block diagram depicting an exemplary concept of the learning environment realized by the learning system according to the invention.

FIG. 7 is an exemplary table showing keywords, subkeywords and theirs allocation of marks. This table shows suggested keywords and keywords in an answer for an essay test ("please list some of interruptions and explain about them") about an information processing lecture. The learning system can grade the examination submitted by a user with reference to the table.

The learning system according to the present invention further may let a user to make a presentation about the lecture to capture images of the user during presentation to evaluate expressive power and communication skills as well as learning outcomes employing AI.

Additionally, the present learning system further may collect learning data including history of learning about every user to provide counseling to respective user based on a database to facilitate learning.

Furthermore, the present learning system may provide experience-oriented type of lecture or educational material such as a laboratory training or an experimental lecture in accordance with each of evaluations of users.

The present learning system further may collect evaluation cases to structure a database to allow users to browse them. The present learning system further may charge fees from persons who browse the evaluation cases or download the educational materials in such a way that the system authenticates an ID with a password.

The present system also may search a properly educational material from other educational database of a third party as well as the own database according to user demand to provide the selected one to the user.

The present system also may prompt a user to input keywords (such as a field, a content, a level, a language, a course schedule, a volume or media of an educational material, etc.) concerning with a desired educational subject or evaluations to search applicable one from the database to provide it to the user.

In order to utilize this learning system around the world, it is conceivable that the present system may link a machine translation system to become available plentiful educational materials or evaluations in a foreign country.

It is noted that in the present learning system a digitalized lecture employing IT is incorporated into an educational material.

Figure 9:
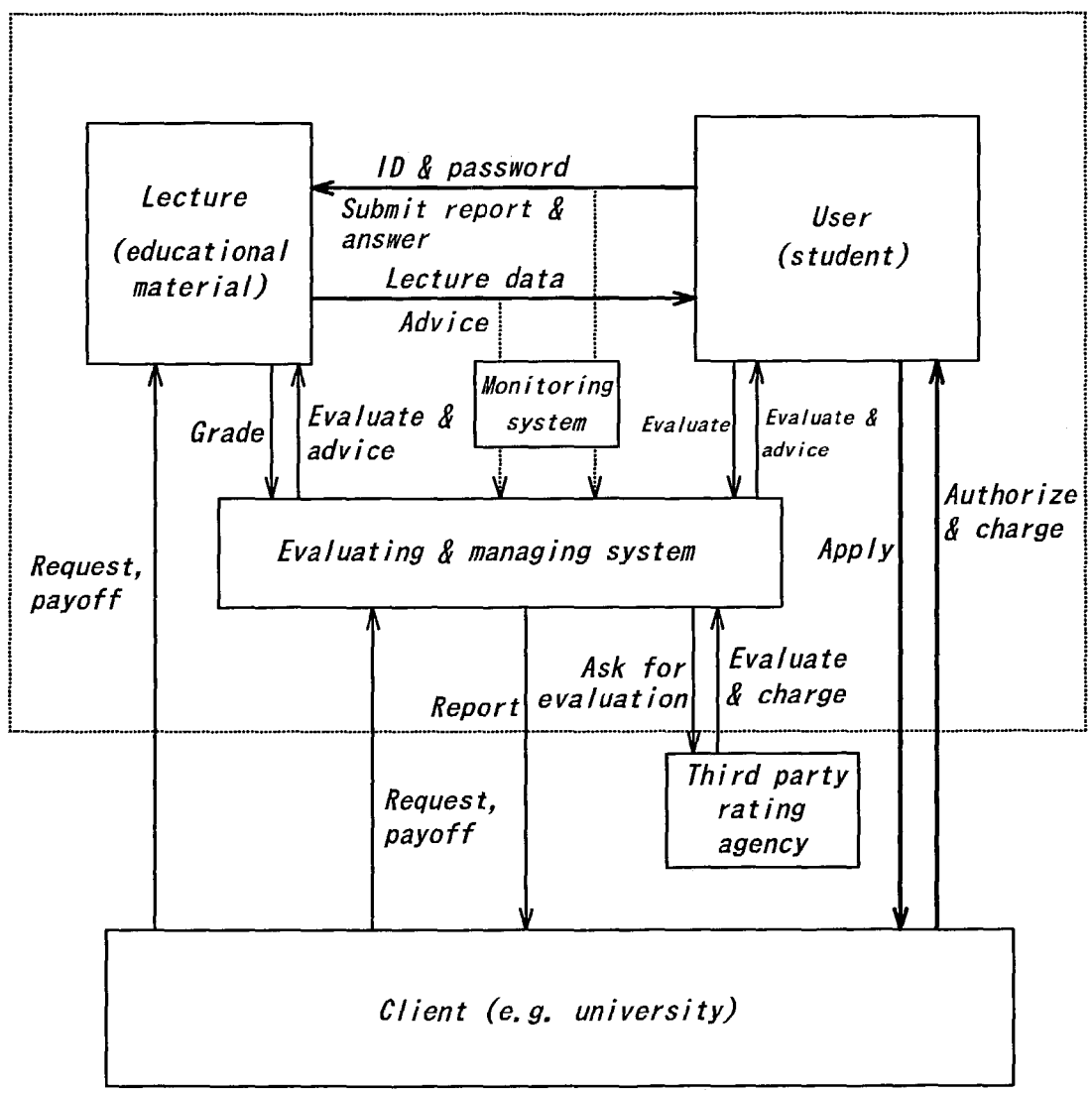
FIG. 9 is a block diagram showing an exemplary concept of the learning environment realized by the learning system according to the invention.

FIG. 8 is a block diagram depicting an exemplary concept of the learning environment realized by the learning system according to the invention and FIG. 9 is also a block diagram depicting an exemplary concept of the learning environment realized by the learning system according to the invention. As shown in FIGS. 8 and 9, the present learning system may identify and manage each of users with an ID and a password preassigned by respective users, and may charge fees if necessary. The present learning system further may comprise recognition means for more exactly recognize individual users by means of any techniques (such as a digital signature, a facial recognition, or a fingerprint, etc.) other than IDs with passwords.

The present learning system further may comprise evaluating means for add any pieces of information (such as results of oral exam, or results of an ordinary test) into the database to totally evaluate a learning activity for an individual student.

The user terminal is typically a PC, but can be a dedicated terminal, a TV, a STB, or a cell phone which is WAP-capable.

The present learning system can be configured to feedback a learning result (i.e. a grade) and/or advice based on the learning result to respective users. Alternatively, the learning system can be configured to prompt a user to input an evaluation for the learning system, or a lecture or an educational material provided by this system and to provide the learning results to a university or a third party to let them to further evaluate the information or to have them to response the evaluation or advice about it.

INDUSTRIAL APPLICABILITY

The advantages of the device according to present invention are summarized as follows:
(1) The present system can easily and frequently perform tests to effectively and timely evaluate user's learning outcomes for respective users.
(2) The present system exploits automatic evaluating function leveraging IT to evaluate learning outcomes in a short period of time. Therefore, a teacher or an instructor can utilize this system to provide properly advice to each student and to provide a properly educational material or a lecture. Furthermore a teacher or an instructor can attain the evaluation results to appropriately coach respective students using the evaluation.
(3) A teacher or an instructor becomes to select the best educational material from the database based on the evaluation for the educational materials and/or the learning outcomes which are associated with the educational materials.
(4) Teachers can shift from conventional "mass education" which is significant workload for teachers to "small education" such as a face to face lecture in a small class.

The above-described systems are exemplary. By way of easily explanation the aspect of the present invention has been mainly described as systems i.e. devices, however it is understood that the present invention may be realized as methods corresponding to the systems, programs embodying the methods as well as a storage media storing the programs. Therefore, it should be appreciated that those skilled in the art will be able to devise numerous embodiments which, although not explicitly shown or disclosed herein, embody the principles of the invention and are thus within the spirit and scope of the present invention. Although the present systems have been described as the components or functions are distributed in distributed computing style between the server and client PC, but can be integrated into one server and can be rearranged without contradiction.

What is claimed is:

1. A learning system, comprising: a server and at least one user terminal connected to said server via a network,
    wherein the server comprises:
        storing means for storing at least one educational material; and
        transmitting means for transmitting said educational material to the user terminal via the network,
    wherein the user terminal comprises:
        receiving means for receiving said educational material from the server via the network;
        presentation means for presenting the received educational material to a user;
    wherein said user terminal further comprises:
        means for presenting one or more predetermined questions, which are prepared for the respective educational materials, for measuring comprehension to prompt the user to input one or more answers or reports to said predetermined questions;

means for accepting said one or more answers or reports from the user in response to said one or more predetermined questions; and means for transmitting said one or more answers or reports to said server via the network, and wherein said server further comprises:

evaluating means for receiving said one or more answers or reports from said user terminal to evaluate comprehension of the user based on said answers or reports by (i) determining whether or not said answers or reports include predetermined one or more keywords expressing comprehension of the user with respect to said educational material to evaluate comprehension of the user based on point values of the included keywords (ii) determining whether or not one or more subkeywords, relating to the keywords, are included in the vicinity of said keywords, and (iii) evaluating comprehension of the user based on point values of the included subkeywords, wherein said point values of said subkeywords vary based upon a distance from each keyword to each corresponding subkeyword.

2. The system according to claim 1, wherein said user terminal further comprises:

recognizing means for recognizing movement of the user while the educational material is presented to the user; and transmitting means for transmitting said recognized movement of the user, wherein the server further comprises:

receiving means for receiving the movement from the user terminal via the network; and evaluating means for evaluating learning behavior of said user based on said movement, and wherein said recognizing means comprises at least one means selected from the group consisting of means for capturing an image of the user, means for capturing a voice of the user, and means for monitoring input status to one or more I/O devices associated with said user terminal.

3. The system according to claim 2, wherein said user terminal further comprises:

identification means for capturing personal identification information of the user prior to presenting the educational material; and transmitting means for transmitting the captured personal identification information to said server via the network, and wherein said server comprises receiving means for receiving said personal identification information from the user terminal.

4. The system according to claim 3, wherein said identification means in the user terminal comprises a biometrics sensor.

* * * * *